(12) United States Patent
Kondo et al.

(10) Patent No.: US 6,519,394 B2
(45) Date of Patent: Feb. 11, 2003

(54) BONDING STRUCTURE OF OPTICAL MEMBERS

(75) Inventors: Jungo Kondo, Nagoya (JP); Tetsuya Ejiri, Nagoya (JP); Saori Takatsuji, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 144 days.

(21) Appl. No.: 09/795,057

(22) Filed: Feb. 26, 2001

(65) Prior Publication Data
US 2001/0051022 A1 Dec. 13, 2001

(30) Foreign Application Priority Data
Mar. 1, 2000 (JP) ........................................ 2000-055753

(51) Int. Cl.[7] ................................................. G02B 6/26
(52) U.S. Cl. ........................................... 385/51; 385/49
(58) Field of Search ............................... 385/51, 52, 54, 385/55, 56, 69, 70, 71, 72

(56) References Cited
U.S. PATENT DOCUMENTS 5,402,260 A * 3/1995 Tsuneda et al. ............. 359/282
6,112,001 A * 8/2000 Kishida et al. ............. 385/147

* cited by examiner

Primary Examiner—Georgia Epps
Assistant Examiner—Mohammad Abutayeh
(74) Attorney, Agent, or Firm—Burr & Brown

(57) ABSTRACT

A bonding structure of optical members has a first optical member, a second optical member, a first support member supporting the first optical member, and a second support member supporting the second optical member. The first support member is bonded to the second support member. The first support member and the second support member are bonded with each other via a hardened acrylic resin adhesive under a condition such that an optical axis of the first optical member and an optical axis of the second optical member are optically aligned with each other with an accuracy of within 1 $\mu$m. A viscosity of the acrylic resin adhesive before hardening is larger than 500 cP and lower than 5000 cP.

4 Claims, 3 Drawing Sheets

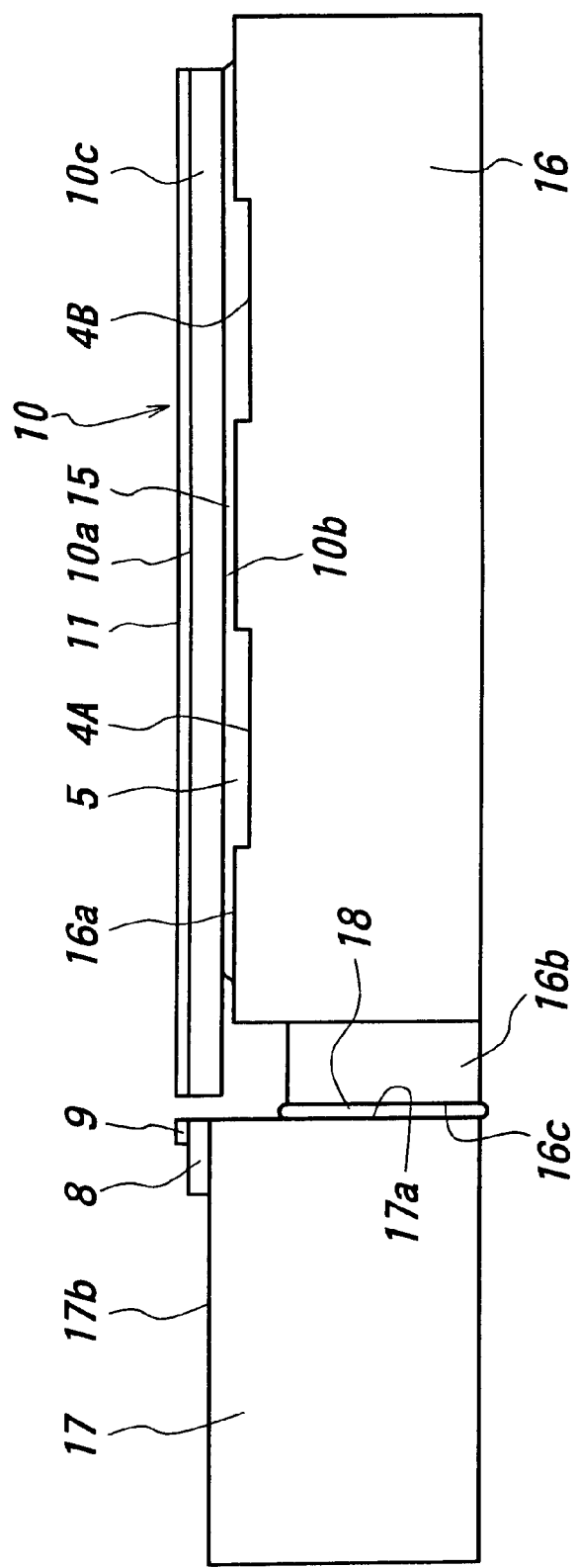

BONDING STRUCTURE OF OPTICAL MEMBERS

BACKGROUND OF THE INVENTION

1. Field of the Invention

The present invention relates to a bonding structure of optical members wherein respective optical axes of a plurality of the optical members such as a laser diode and an optical waveguide substrate are optically aligned with each other with an accuracy of sub-microns while support members supporting the optical members are bonded.

2. Description of Related Art

As to a light source for a blue laser used for an optical pickup and so on, a second harmonic generation (SHG) device of a quasi phase matched (QPM) type using an optical waveguide, in which a periodical polarization reversal construction is formed on a single crystal of lithium niobate or lithium tantalite, is expected.

In order to manufacture such a device mentioned above, it is necessary to fix the optical waveguide substrate, on which the polarization reversal construction is formed, and a laser diode to a support member, and align an optical axis of the optical waveguide and an optical axis of laser diode with each other with an accuracy of sub-microns. In this case, generally, the optical waveguide substrate is bonded to a surface of the support member by means of an optical adhesive, and the optical adhesive is hardened. In addition, it is necessary to bond a support member supporting the laser diode to the support member supporting the optical waveguide substrate. In this case, use may be made of a resin of ultraviolet ray hardening type, a resin of visible ray hardening type, and an instant adhesive.

However, it is very difficult on an actual manufacturing to align optically the optical axes of the optical waveguide and the laser diode with an accuracy of sub-microns while the optical adhesive is hardened. In order to align the optical axes accurately, it is necessary to harden the adhesive arranged between the two support members just after the optical axes of the laser conductor and the optical waveguide are aligned accurately with an accuracy of sub-microns. Moreover, it is necessary to harden the adhesive after the two support members are bonded. In addition, since the optical member must have generally reliability at a wide temperature range such as from −40° C. to +80° C., it is necessary to endure a heat cycle under such a temperature range. Particularly, almost all surface of the support member supporting the laser diode is coated by a gold plating film. In this case, since a surface of the gold film is inactive, it is difficult to bond.

The inventors inspected the bonding structures using various kinds of resin adhesives. As a result, it was founded that a high strength bonding was obtained with respect to a surface particularly a gold plated surface of the support member by using an acrylic resin adhesive. However, even in the case that the two support members were bonded by using the acrylic resin adhesive, it was observed that an optical coupling loss between the laser diode and the optical waveguide was increased after a heat cycle test.

SUMMARY OF THE INVENTION

An object of the present invention is to provide a bonding structure of optical members having a first optical member, a second optical member, a first support member supporting the first optical member, and a second support member supporting the second optical member, wherein the first support member is bonded to the second support member, which can obtain a sufficient bonding strength between the support members and can suppress an increase of an optical coupling loss after applying a heat cycle or a thermal shock thereto.

According to the present invention, a bonding structure of optical members having a first optical member, a second optical member, a first support member supporting the first optical member, and a second support member supporting the second optical member, wherein the first support member is bonded to the second support member, comprises a construction such that:

(1) the first support member and the second support member are bonded with each other via a hardened acrylic resin adhesive under a condition such that an optical axis of the first optical member and an optical axis of the second optical member are optically aligned with each other with an accuracy of within 1 $\mu$m; and (2) a viscosity of the acrylic resin adhesive before hardening is larger than 500 cP and lower than 5000 cP.

BRIEF DESCRIPTION OF THE DRAWINGS

For better understandings of the present invention, reference is made to the attached drawings wherein:

FIG. 3 is a front view depicting another embodiment of the bonding structure according to the invention.

DESCRIPTION OF THE PREFERRED EMBODIMENT

Figure 1:
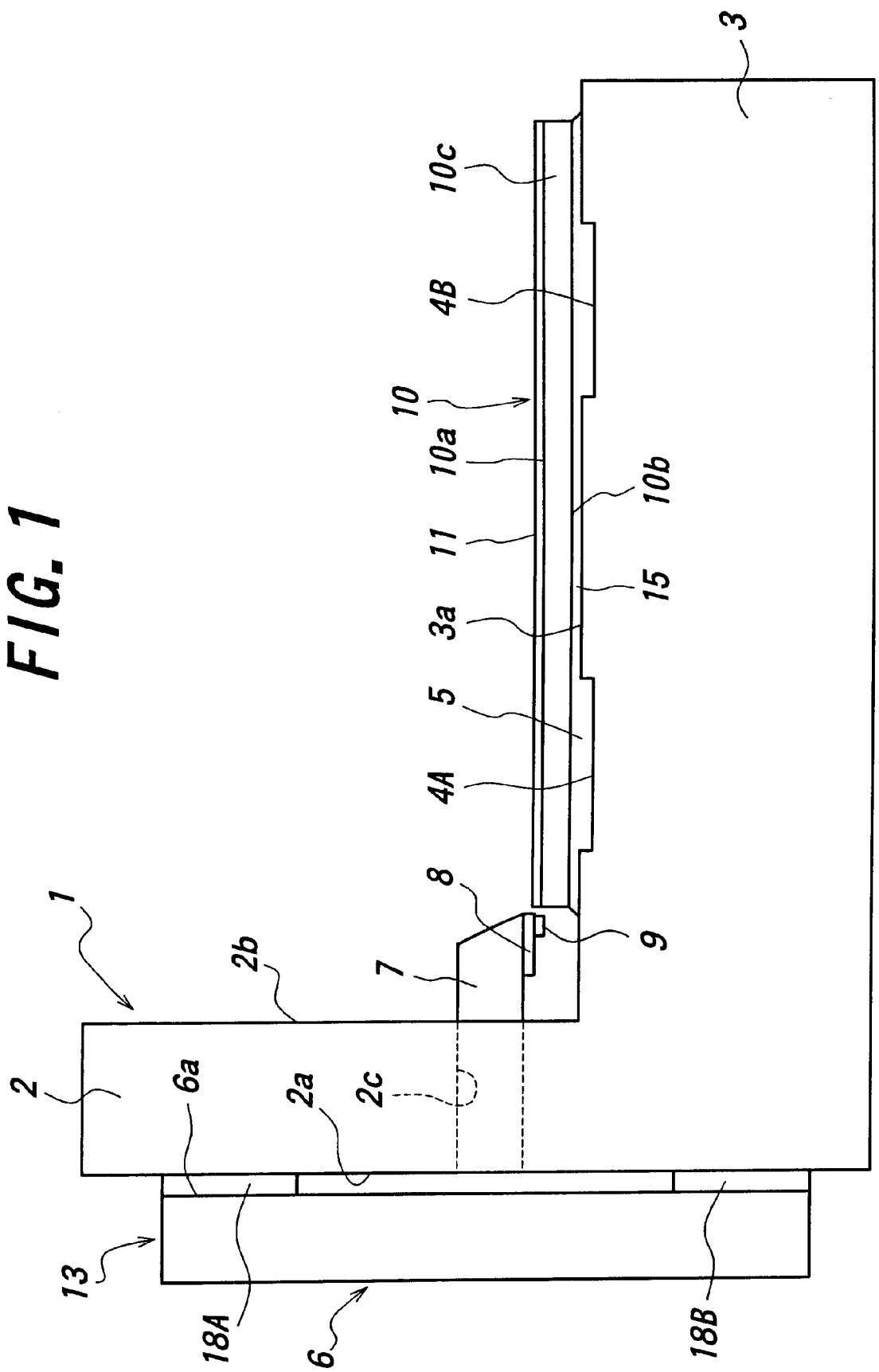
FIG. 1 is a front view showing one embodiment of a bonding structure according to the invention.

The present invention is characterized in that a bonding structure of optical members having a first optical member, a second optical member, a first support member supporting the first optical member, and a second support member supporting the second optical member, wherein the first support member is bonded to the second support member, comprises a construction such that: the first support member and the second support member are bonded with each other via a hardened acrylic resin adhesive under a condition such that an optical axis of the first optical member and an optical axis of the second optical member are optically aligned with each other with an accuracy of within 1 $\mu$m; and a viscosity of the acrylic resin adhesive before hardening is larger than 500 cP and lower than 5000 cP.

The inventors investigated an increase of an optical coupling loss after applying a heat cycle or a thermal shock to the bonding structure. As a result, it was founded that a viscosity of the acrylic resin adhesive, when it was applied to the bonding structure, was important. That is to say, it was founded that it was possible to suppress largely an increase of the optical coupling loss after the heat cycle or the thermal shock by making a viscosity of the acrylic resin adhesive before hardening to a level larger than 500 cP and lower than 5000 cP.

The reason why such a function and an advantage are obtained is not clear. Perhaps, since an amount of low molecular weight components in the acrylic resin adhesive is increased if a viscosity of the acrylic resin adhesive is low, a shrink amount due to hardening becomes larger, and thus it is assumed that a displacement of the optical axes become larger after the heat cycle. Moreover, if a viscosity of the adhesive becomes higher, a filling state of the adhesive between the first support member and the second support member is not sufficient, or such a filling state becomes uneven from a viewpoint of geometry. Therefore, it is assumed that an optical axis displacement occurs easily after the heat cycle.

A viscosity of the adhesive is measured by BH type viscometer according to JIS-K-6838. Moreover, from a viewpoint of decreasing the optical coupling loss after the heat cycle or the thermal shock more and more, it is preferred to make a viscosity of the adhesive to a level larger than 1000 cP and lower than 4000 cP.

Preferable amounts of a polymerizable monomer and an acrylate oligomer in the acrylic resin adhesive are as follows:

(a) Polymerizable monomer: 45–70 wt % (more preferably 48–53 wt %); and
(b) Acrylate oligomer: 30–45 wt % (more preferably 33–43 wt %).

As to the acrylic resin adhesive, use is made of a denaturalized acrylic resin such as a cyanoacrylate resin and an urethane acrylate resin other than a non-denaturalized resin adhesive. A kind of the polymerizable monomer is not limited if it has an acrylic functional group. For example, use is made of an acrylic acid, an alkylester of acrylic acid, an arylester, a cycloalkyle ester, a hydroxy acrylate.

As to the acrylate oligomer, use is made of an epoxy acrylate, an urethane acrylate, an polyester acrylate and so on.

In the resin adhesive, it is possible to include an additive such as a photo polymerization starting agent and an organic peroxide. As to the photo polymerization starting agent, use is made of an acetophenone agent, a benzoin agent, a benzophenone agent, a thioxanthone and so on. An amount of the photo polymerization starting agent is preferably lower than 10 wt %.

A photo polymerization sensitizer may be used together with the photo polymerization starting agent so as to control a hardening property.

The resin adhesive is preferably made of a resin of ultraviolet ray hardening type. As to a source of the ultraviolet ray, use is made of an ultraviolet ray generating apparatus utilizing a low pressure mercury lamp, a high pressure mercury lamp, a metal halide lamp, a xenon lamp, an arc lamp and so on. An ultraviolet ray hardening may be performed in a normal atmosphere or an inert gas such as nitrogen and so on.

Moreover, as to the acrylilc resin adhesive, an adhesive of primer hardening type is used most preferably. Particularly, in the case that a precious metal plating such as a gold plating and so on is arranged on a surface of the first support member (laser diode side), it is preferred to apply preliminarily a primer on the surface to be adhered.

As to the first optical member, use is made of a light emitting diode and an optical fiber array except for the laser diode. As to the second optical member, use is made of the optical fiber array except for the optical waveguide substrate (including a frequency conversion substrate for SHG: SHG substrate). Particularly, the optical waveguide substrate is preferred.

As to materials of the optical waveguide substrate (including SHG substrate), use is made of $LiNbO_3$, Mg doped $LiNbO_3$, $LiTaO_3$, $LiNbO_3$-$LiTaO_3$ solid solution, lithium kalium niobate, lithium kalium niobate-lithium kalium tantalite solid solution, $KTiOPO_4$ and so on. Materials of the support members are not limited, and use is made of a metal such as SUS, kovar and so on, and ceramics or glass. As to a particularly preferred ceramics, use is for example made of an alumina, a zirconia, and a glass ceramic. In addition, it is preferred to use the other materials such as an engineering plastic that is stable on a size and a thermal property. In this case, it is necessary to select the materials, a thermal expansion coefficient of which is close to that of the optical members.

Figure 2:
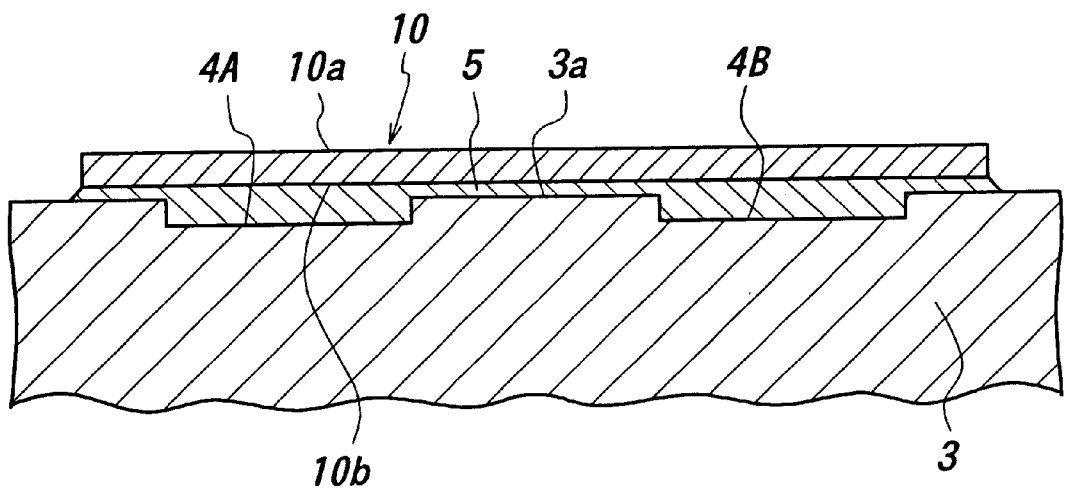
FIG. 2 is a partial cross sectional view illustrating the bonding structure of FIG. 1.

FIG. 1 is a front view showing one embodiment of a bonding structure according to the invention, and FIG. 2 is a cross sectional view illustrating the bonding structure shown in FIG. 1. In the bonding structure shown in FIGS. 1 and 2, a first support member 13 and a second support member 1 are bonded.

The second support member 1 comprises a mount portion 2 of a laser diode 9 extended perpendicularly, and a mount portion 3 of an optical waveguide substrate 10 extended horizontally. A surface 6a of a main body 6 of the first support member (can package) 13 for supporting the laser diode 9 is bonded to one major surface 2a of the mount portion 2. A stem 7 is inserted in a through hole 2c of the mount portion 2 and is projected from the other surface 2b of the mount portion 2. A sub-mount (laser diode chip carrier) 8 is arranged on an under surface of the stem 7, and the laser diode 9 is arranged on an under surface of the sub-mount 8.

A recess 4A and a recess 4B having a predetermined number and size are formed on a major surface (surface to be adhered) 3a of the mount portion 3, and a rear surface (surface to be adhered) 10b of the optical waveguide substrate 10 is bonded to the major surface 3a. In the embodiment shown in FIGS. 1 and 2, a hardened substance 5 of the optical adhesive is filled in the recesses 4A and 4B and is arranged in a space between the major surface 3a and the rear surface 10b of the optical waveguide substrate 10, so that an adhesive layer 15 is formed. In the case that the adhesive layer 15 is formed, it is preferred to control a thickness of the adhesive layer 15 to a level of 1–3 μm, which can be formed by a capillary phenomenon. However, it is not always necessary to arrange the adhesive layer 15 mentioned above, and almost all the optical adhesive may be filled in the recesses 4A and 4B only. A numeral 10a is a surface of the optical waveguide substrate 10, and a numeral 10c is a side surface thereof.

Moreover, the first support member 13 and the second support member 1 are bonded in such a manner that the acrylic resin adhesive is arranged between the major surface 2a of the mount portion 2 and the surface 6a of the first support member 13 and is hardened so as to form adhesive layers 18A and 18B. When the hardening of the adhesive is finished, it is necessary to align an optical axis of the laser diode 9 and an optical axis of an optical waveguide 11 arranged on the surface 10a of the optical waveguide substrate 10 with an accuracy of lower than 1 μm two-dimensionally viewed on a perpendicular plane with respect to the optical axis. It is further preferred to align them with an accuracy of lower than 0.2 μm.

FIG. 3 is a front view showing another embodiment of the bonding structure according to the invention. In this embodiment, a first support member 17 and a second support member 16 are bonded.

In this embodiment, the sub-mount (laser diode carrier) 8 is arranged on a major surface 17b of the first support member 17, and the laser diode 9 is arranged on an upper surface of the sub-mount 8.

The recesses 4A and 4B having a predetermined number and size are formed on a major surface (surface to be adhered) 16a of the second support member 16. The rear surface (surface to be adhered) 10b of the optical waveguide substrate 10 is bonded to the major surface 16a. In the embodiment shown in FIG. 3, the hardened substance 5 of the optical adhesive is filled in the recesses 4A and 4B and is arranged in a space between the major surface 3a and the rear surface 10b of the optical waveguide substrate 10, so that the adhesive layer 15 is formed. However, it is not always necessary to arrange the adhesive layer 15 mentioned above, and almost all the optical adhesive may be filler in the recesses 4A and 4B only.

The first support member 17 and the second support member 16 are bonded in such a manner that the acrylic resin adhesive is arranged between a side surface (surface to be adhered) 17a of the first support member 17 and a major surface (surface to be adhered) 16c of a projection 16b of the second support member 16 and is hardened so as to form an adhesive layer 18.

Hereinafter, an actual experimental result will be explained.

According to the method mentioned above, the bonding structure shown in FIG. 3 was manufactured. Materials of the first support member 17 and the second support member 16 are SUS. A gold plating film having a thickness of 2 μm was formed on a surface of the first support member 17. A size of the first support member 17 was 7 mm×2 mm×1.5 mm. A material of the optical waveguide substrate 10 was a lithium niobate single crystal, and it was manufactured by a proton exchange method.

The second support member 16 and the optical waveguide substrate 10 were bonded by using the optical adhesive of ultraviolet ray hardening type, instant hardening type, or visible ray hardening type. The optical adhesive mentioned above was filled in the recesses 4A and 4B by means of a dispenser, and the rear surface 10b of the optical waveguide substrate 10 was provided on the major surface 16a of the second support member 16. The recesses 4A and 4B were formed in such a manner that they cross in a lateral direction on the major surface 16a of the second support member 16. In the recesses 4A and 4B, a width was 3 mm and a depth was 50 μm.

Moreover, after the primer was applied by means of a cotton bud to the side surface (surface to be adhered) 17a to which the gold plated film was arranged, an optical axis alignment was performed in such a manner that the optical coupling loss between the optical waveguide and the laser diode was made minimum. After that, the acrylic resin adhesive was applied by means of the dispenser on almost all the major surface (surface to be adhered) 16c having a size of 7 mm×1 mm, and then hardened by emanating an ultraviolet ray on the adhesive. A viscosity of the acrylic resin adhesive was varied as shown in Table 1.

After the bonding was finished, a laser having a wavelength of 840 nm was emanated from the laser diode 9, and a light intensity transmitted through the optical waveguide 11 was measured. Then, an attenuation of laser (dB) (primary optical coupling loss) was calculated.

Then, with respect to the bonding structure, a temperature ascending test and a temperature descending test were performed at a rate of 1° C./minute between −40° C. and 80° C. The temperature ascending and descending cycle was repeated 200 times as a heat cycle test, and then the optical coupling loss was measured as mentioned above. Then, a variation of the optical coupling loss after the heat cycle test (a difference between the optical coupling loss before the heat cycle test and the optical coupling loss after the heat cycle test) was calculated (unit: dB).

TABLE 1

| Viscosity of acrylic resin adhesive (cP) | Variation of optical coupling loss after heat cycle test (dB) |
| --- | --- |
| 100 | 5.0 |
| 400 | 4.0 |
| 500 | 2.0 |
| 1000 | 0.4 |
| 1600 | 0.2 |
| 3600 | 0.1 |
| 4000 | 0.2 |
| 5000 | 2.0 |
| 6000 | 5.0 |

As mentioned above, according to the invention, the bonding strength between the support members can be made sufficient and an increase of the optical coupling loss can be suppressed even after the bonding structure was subjected to the heat cycle or the thermal shock.

What is claimed is:

1. A bonding structure of optical members having a first optical member, a second optical member, a first support member supporting the first optical member, and a second support member supporting the second optical member, wherein the first support member is bonded to the second support member, comprising a construction such that:

(1) the first support member and the second support member are bonded with each other via a hardened acrylic resin adhesive under a condition such that an optical axis of the first optical member and an optical axis of the second optical member are optically aligned with each other with an accuracy of within 1 μm; and (2) a viscosity of the acrylic resin adhesive before hardening is larger than 500 cP and lower than 5000 cP.

2. The bonding structure according to claim 1, wherein the first optical member is a laser diode and the second optical member is an optical waveguide substrate, wherein an optical axis of the laser diode and an optical axis of the optical waveguide are optically aligned with each other with an accuracy of within 1 μm.

3. The bonding structure according to claim 1, wherein a surface of the first support member is coated by a gold film.

4. The bonding structure according to claim 1, wherein the acrylic resin adhesive is an ultraviolet ray hardening type.

* * * * *